United States Patent
Ashrafzadeh et al.

(10) Patent No.: US 9,322,127 B2
(45) Date of Patent: Apr. 26, 2016

(54) METHOD OF OPERATING A HOME APPLIANCE

(71) Applicant: Whirlpool Corporation, Benton Harbor, MI (US)

(72) Inventors: Farhad Ashrafzadeh, Bowling Green, KY (US); James P. Carow, Saint Joseph, MI (US); Moeed Mukhtar, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 337 days.

(21) Appl. No.: 13/899,825

(22) Filed: May 22, 2013

(65) Prior Publication Data

US 2014/0350728 A1  Nov. 27, 2014

(51) Int. Cl.
| | |
|---|---|
| *G05B 15/02* | (2006.01) |
| *G05B 13/02* | (2006.01) |
| *D06F 58/28* | (2006.01) |
| *D06F 39/00* | (2006.01) |
| *D06F 33/02* | (2006.01) |

(52) U.S. Cl.
CPC ............... *D06F 58/28* (2013.01); *D06F 33/02* (2013.01); *D06F 39/006* (2013.01); *D06F 2058/2854* (2013.01); *D06F 2202/12* (2013.01); *D06F 2204/10* (2013.01); *G05B 2219/23399* (2013.01); *G05B 2219/2613* (2013.01)

(58) Field of Classification Search
CPC ................... G05B 15/02; G05B 13/02; G05B 2219/2613; G05B 2219/23399; D06F 58/28; D06F 2058/2854; D06F 33/02; D06F 2204/10; D06F 2202/12; D06F 39/006

USPC ............ 700/19–20, 28, 32, 37, 44–45, 47, 54
See application file for complete search history.

(56) References Cited

U.S. PATENT DOCUMENTS

| | | | |
|---|---|---|---|
| 4,609,343 A * | 9/1986 | Tejfalussy | 432/36 |
| 5,251,288 A * | 10/1993 | Nomura et al. | 706/12 |
| 5,386,099 A * | 1/1995 | Has | 219/413 |
| 5,711,606 A * | 1/1998 | Koether | 374/149 |
| 6,142,666 A * | 11/2000 | Koether et al. | 374/149 |
| 6,505,475 B1 | 1/2003 | Zugibe et al. | |
| 7,059,143 B1 | 6/2006 | Zugibe et al. | |
| 7,086,240 B1 | 8/2006 | Zugibe et al. | |
| 7,533,536 B1 | 5/2009 | Zugibe et al. | |

(Continued)

FOREIGN PATENT DOCUMENTS

KR          101114206 B1     2/2012

OTHER PUBLICATIONS

WO 2012007299 A1; Method for operating a clothes drying appliance and clothes drying appliance; 8 pages; Jablonski; English traslation provided by WIPO website; printed from Internet on Jun. 23, 2015.*

(Continued)

*Primary Examiner* — Ronald Hartman, Jr.

(57) ABSTRACT

A method of operating a home appliance having a treating chamber for receiving an article for treatment according to an automatic cycle of operation stored in memory of a programmable controller operably controlling one or more actuators to implement the cycle of operation, the method includes implementing the cycle of operation, receiving sensor feedback, calculating gradients from the sensor feedback, and controlling an actuator based thereon.

19 Claims, 9 Drawing Sheets

(56) References Cited

U.S. PATENT DOCUMENTS

| | | | |
|---|---|---|---|
| 7,805,952 B1 | 10/2010 | Zugibe et al. | |
| 8,043,642 B2 * | 10/2011 | Schonemann | 426/233 |
| 8,096,140 B2 | 1/2012 | Seem | |
| 8,863,559 B2 * | 10/2014 | Czyzewski et al. | 68/12.22 |
| 2007/0159454 A1 * | 7/2007 | Rodriguez et al. | 345/156 |
| 2009/0056036 A1 * | 3/2009 | Herkle et al. | 8/149.3 |
| 2009/0188660 A1 * | 7/2009 | Steffens | 165/253 |
| 2009/0260256 A1 * | 10/2009 | Beaulac | 34/528 |
| 2009/0274805 A1 * | 11/2009 | Schonemann | 426/233 |
| 2010/0049369 A1 * | 2/2010 | Lou et al. | 700/274 |
| 2011/0276180 A1 | 11/2011 | Seem | |
| 2012/0317832 A1 * | 12/2012 | Lakkineni et al. | 34/477 |
| 2013/0048626 A1 * | 2/2013 | Seo et al. | 219/510 |
| 2013/0059261 A1 * | 3/2013 | Sprague | 432/64 |
| 2013/0260664 A1 * | 10/2013 | Morris et al. | 454/184 |

OTHER PUBLICATIONS

WO 2011101237 A1; Method for adjusting a spinning speed of a drum of a household appliance for caring for laundry items; 4 pages; Compains et al.; English translation provided by WIPO website; printed from Internet on Jun. 23, 2015.*

* cited by examiner

METHOD OF OPERATING A HOME APPLIANCE

BACKGROUND OF THE INVENTION

Home appliances perform a variety of cycles of operation, and users are increasingly interested in energy efficient home appliances that reduce the amount of energy an appliance uses to decrease energy costs. Users are also increasingly interested in improved performance and reduced cycle of operation times.

BRIEF DESCRIPTION OF THE INVENTION

In one aspect, the invention relates to a method of operating a home appliance including implementing the cycle of operation by executing on the controller a closed loop control algorithm having programmable control variables for at least some of the actuators, receiving sensor feedback related to at least one of the control variables for one of the actuators during the implementing of the cycle of operation, calculating at least one gradient from the sensor feedback for the at least one of the control variables, and controlling the one of the actuators by adjusting the control variable based on the calculated at least one gradient with an auto-tuning algorithm.

DESCRIPTION OF EMBODIMENTS OF THE INVENTION

Figure 1:
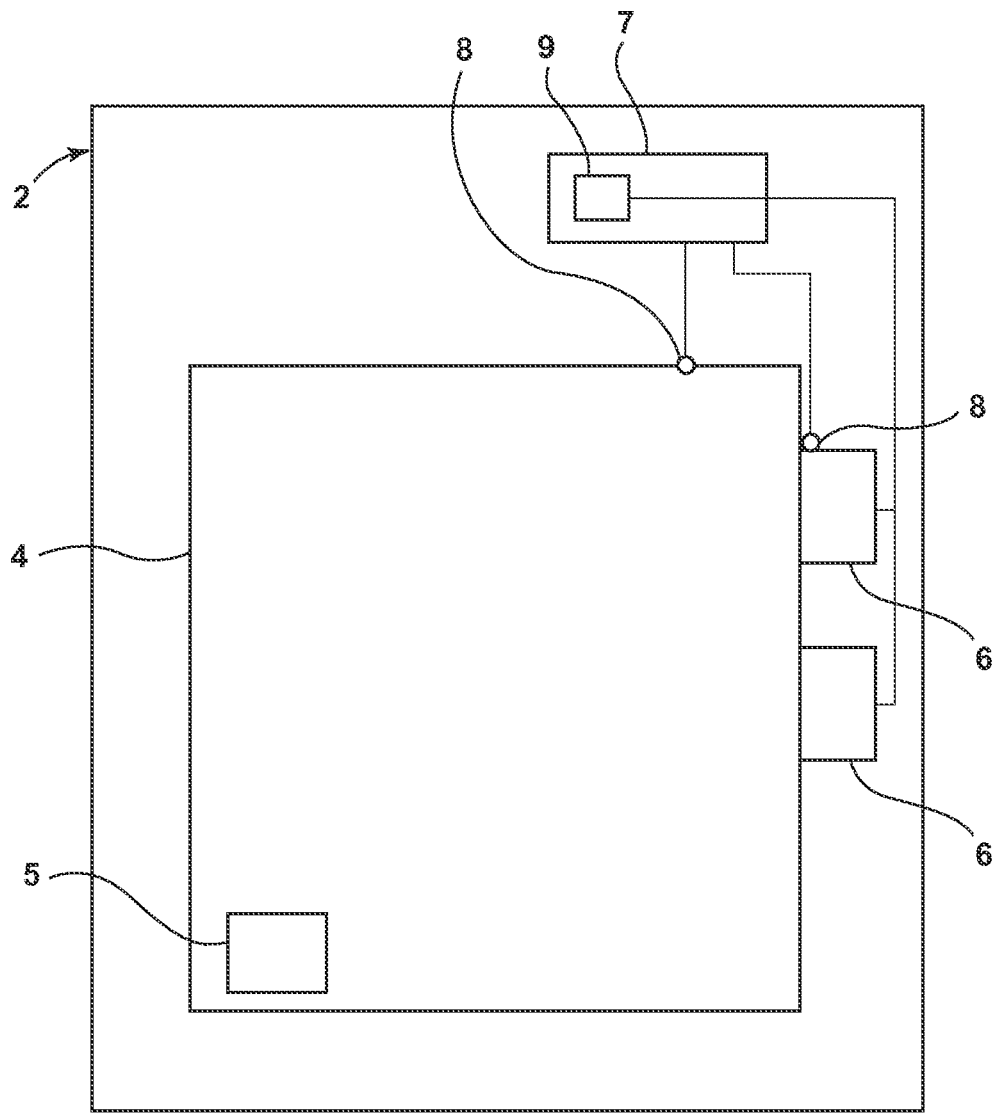
FIG. 1 is a schematic view of a home appliance.

FIG. 1 is a schematic view of a home appliance 2, which may be used to implement embodiments of the invention. The home appliance 2 includes a treating chamber 4 for receiving an article 5 for treatment according to an automatic cycle of operation. One or more actuators 6 may be included in the home appliance 2 and such actuators 6 may have programmable control variables that may be controlled by a programmable controller 7 to execute the cycle of operation. One or more sensors 8 may be operably coupled with the controller 7 and may provide feedback to the controller 7. The cycle of operation may be stored in memory 9 within the controller 7 such that during operation it may operably control one or more actuators 6 to implement the cycle of operation.

The home appliance 2 may be any suitable home or domestic appliance that performs a particular job in a home, including those relating to cleaning, cooking, or food preservation. While the appliance 2 has been illustrated generically, the home appliance may be any suitable home appliance, including, but not limited to a dishwasher, a refrigerator, a freezer, a range, a stove, an oven, a cooktop, a clothes washing machine, a clothes dryer, a combination washing machine and dryer, a dispensing dryer; a tumbling or stationary refreshing/revitalizing machine, an extractor, a non-aqueous washing apparatus, a revitalizing machine, etc. All of these examples of home appliances may receive one or more article(s), may include any number of actuators and sensors, and may perform a useful cycle of operation on the article(s). For example, Table 1 shows a variety of home appliances having a variety of sensors and actuators that may be used to implement embodiments of the invention.

TABLE 1

Exemplary Appliances, Sensors, and Actuators

| Appliance | Sensors | Actuators |
| --- | --- | --- |
| Clothes dryer | Temperature, Moisture, Air Flow | Heater, Blower, Drum Motor |
| Clothes Washer | Speed, Acceleration | Drum Motor |
| Refrigerator | Temperature, Air Flow | Compressor, Flow Diverter |
| Dishwasher | Soil, Temperature | Motor-Pump, Heater |

Regardless of the type of home appliance and its specific sensors and actuators each home appliance provides the structure necessary for the implementation of embodiments of the invention. One embodiment of the method will now be described in terms of the operation of the appliance 2.

Figure 2:
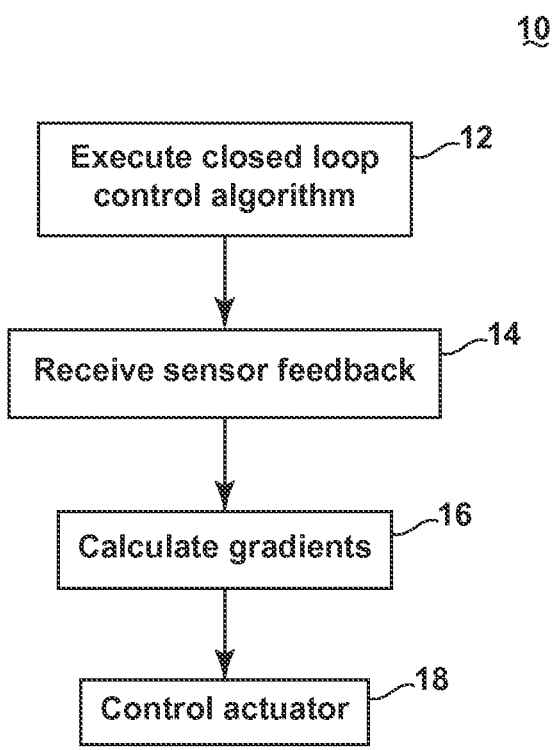
FIG. 2 is a flow chart of a method of operating a home appliance during a cycle of operation being performed by the appliance.

FIG. 2 is a flow chart depicting a method 10 of operating a home appliance, according to an embodiment of the invention. The method 10 may be executed at least in part by the controller 7 of the home appliance 2 during a cycle of operation of the appliance 2. The sequence of steps depicted is for illustrative purposes only and is not meant to limit the method 10 in any way as it may be understood that the steps may proceed in a different logical order, additional or intervening steps may be included, or described steps may be divided into multiple steps, without detracting from the invention.

The method 10 begins by implementing the cycle of operation at 12. The cycle of operation may be implemented by executing on the controller 7 a closed loop control algorithm having programmable control variables for at least some of the actuators 6. The control variables may include gains. The closed loop control algorithm may be stored in the memory 9 of the controller and may be implemented by any suitable processing unit within the controller 7. Sensor feedback related to at least one of the control variables for one of the actuators 6 may be received during the implementing of the cycle of operation at 14. For example, where the home appliance includes a clothes washing machine, the sensor feedback may include data provided from a speed sensor or acceleration sensor of the clothes washing machine. Further, where the home appliance includes a refrigerator, the sensor feedback may include data provided from a temperature sensor or airflow sensor of the refrigerator. In the case where the home appliance 2 includes a dishwasher, the sensor feedback may include data provided from a soil sensor or a temperature sensor of the dishwasher.

At 16, at least one gradient from the sensor feedback may be calculated for the at least one of the control variables and at 18 one of the actuators 6 may be controlled by adjusting the control variable based on the calculated at least one gradient with an auto-tuning algorithm. This may include that the control variable may be increased or decreased. The auto-tuning algorithm may include any suitable auto-tuning algorithm including an extremum seeking control algorithm or an iterative feedback tuning algorithm. The receiving at 14, calculating at 16, and controlling at 18 may be automatically executed on a predetermined schedule or may be prompted by a user input.

Figure 3:
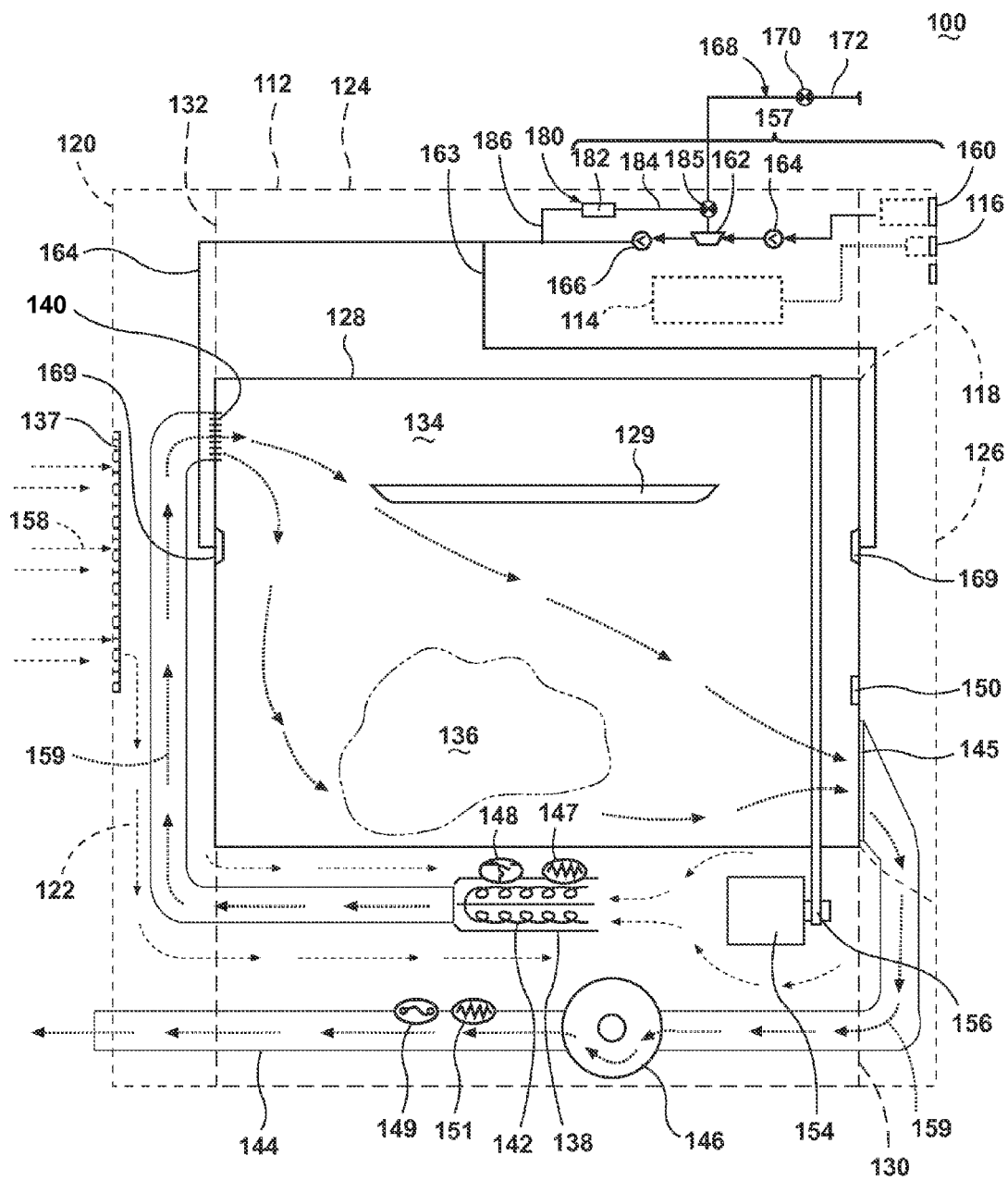
FIG. 3 is a schematic view of a home appliance in the form of a clothes dryer.

A more specific example may prove useful, FIG. 3 illustrates that the home appliance may be a clothes dryer 100 including a cabinet 112 in which may be provided a controller 114 that may receive input from a user through a user interface 116 for selecting a cycle of operation and controlling the operation of the clothes dryer 100 to implement the selected cycle of operation. The cabinet 112 may be defined by a front wall 118, a rear wall 120, and a pair of side walls 122 supporting a top wall 124. A chassis may be provided with the walls being panels mounted to the chassis. A door 126 may be hingedly mounted to the front wall 118 and may be selectively movable between opened and closed positions to close an opening in the front wall 118, which provides access to the interior of the cabinet 112.

A rotatable drum 128 may be disposed within the interior of the cabinet 112 between opposing stationary front and rear bulkheads 130, 132, which, along with the door 126, collectively define a treating chamber 134 for treating laundry. As illustrated, and as may be the case with most clothes dryers, the treating chamber 134 may not be fluidly coupled with a drain. Thus, any liquid introduced into the treating chamber 134 may not be removed merely by draining.

The drum 128 may include at least one lifter 129. In most dryers, there may be multiple lifters. The lifters may be located along an inner surface of the drum 128 defining an interior circumference of the drum 128. The lifters may facilitate movement of the laundry 136 within the drum 128 as the drum 128 rotates.

The drum 128 may be operably coupled with an actuator in the form of a motor 154 to selectively rotate the drum 128 during a cycle of operation. The coupling of the motor 154 to the drum 128 may be direct or indirect. As illustrated, an indirect coupling may include a belt 156 coupling an output shaft of the motor 154 to a wheel/pulley on the drum 128. A direct coupling may include the output shaft of the motor 154 coupled with a hub of the drum 128.

An air system may be provided to the clothes dryer 100. The air system supplies air to the treating chamber 134 and exhausts air from the treating chamber 134. The supplied air may be heated or not. The air system may have an air supply portion that may form, in part, a supply conduit 138, which has one end open to ambient air via a rear vent 137 and another end fluidly coupled with an inlet grill 140, which may be in fluid communication with the treating chamber 134. An actuator in the form of a heating element 142 may lie within the supply conduit 138 and may be operably coupled with and controlled by the controller 114. If the heating element 142 may be turned on, the supplied air will be heated prior to entering the drum 128.

The air system may further include an air exhaust portion that may be formed in part by an exhaust conduit 144. A lint trap 145 may be provided as the inlet from the treating chamber 134 to the exhaust conduit 144. An actuator in the form of a blower 146 may be fluidly coupled with the exhaust conduit 144. The blower 146 may be operably coupled with and controlled by the controller 114. Operation of the blower 146 draws air into the treating chamber 134 as well as exhausts air from the treating chamber 134 through the exhaust conduit 144. The exhaust conduit 144 may be fluidly coupled with a household exhaust duct (not shown) for exhausting the air from the treating chamber 134 to the outside of the clothes dryer 100.

The air system may further include various sensors and other components, such as a thermistor 147 and a thermostat 148, which may be coupled with the supply conduit 138 in which the heating element 142 may be positioned. The thermistor 147 and the thermostat 148 may be operably coupled with each other. Alternatively, the thermistor 147 may be coupled with the supply conduit 138 at or near to the inlet grill 140. Regardless of its location, the thermistor 147 may be used to aid in determining an inlet temperature. A thermistor 151 and a thermal fuse 149 may be coupled with the exhaust conduit 144, with the thermistor 151 being used to determine an outlet air temperature.

A moisture sensor 150 may be positioned in the interior of the treating chamber 134 to monitor the amount of moisture of the laundry in the treating chamber 134. One example of a moisture sensor 150 may be a conductivity strip. The moisture sensor 150 may be operably coupled with the controller 114 such that the controller 14 receives output from the moisture sensor 150. The moisture sensor 150 may be mounted at any location in the interior of the dispensing dryer 100 such that the moisture sensor 150 may be able to accurately sense the moisture content of the laundry. For example, the moisture sensor 150 may be coupled with one of the bulkheads 130, 132 of the drying chamber 134 by any suitable means.

A dispensing system 157 may be provided to the clothes dryer 100 to dispense one or more treating chemistries to the treating chamber 134 according to a cycle of operation. As illustrated, the dispensing system 157 may be located in the interior of the cabinet 112 although other locations are also possible. The dispensing system 157 may be fluidly coupled with a water supply 168. The dispensing system 157 may be further coupled with the treating chamber 134 through one or more nozzles 169. As illustrated, nozzles 169 are provided to the front and rear of the treating chamber 134 to provide the treating chemistry or liquid to the interior of the treating chamber 134, although other configurations are also possible. The number, type and placement of the nozzles 169 are not germane to the invention.

As illustrated, the dispensing system 157 may include a reservoir 160, which may be a cartridge, for a treating chemistry that may be releasably coupled with the dispensing system 157, which dispenses the treating chemistry from the reservoir 160 to the treating chamber 134. The reservoir 160 may include one or more cartridges configured to store one or more treating chemistries in the interior of cartridges. A mixing chamber 162 may be provided to couple the reservoir 160 to the treating chamber 134 through a supply conduit 163. Pumps such as a metering pump 164 and delivery pump 166 may be provided to the dispensing system 157 to selectively supply a treating chemistry and/or liquid to the treating chamber 134 according to a cycle of operation. The water supply 168 may be fluidly coupled with the mixing chamber 162 to provide water from the water source to the mixing chamber 162. The water supply 168 may include an inlet valve 170 and a water supply conduit 172. It may be noted that, instead of water, a different treating chemistry may be provided from the exterior of the clothes dryer 100 to the mixing chamber 162.

The treating chemistry may be any type of aid for treating laundry, non-limiting examples of which include, but are not limited to, water, fabric softeners, sanitizing agents, de-wrinkling or anti-wrinkling agents, and chemicals for imparting desired properties to the laundry, including stain resistance, fragrance (e.g., perfumes), insect repellency, and UV protection.

The dryer 100 may also be provided with a steam generating system 180 which may be separate from the dispensing system 157 or integrated with portions of the dispensing system 157 for dispensing steam and/or liquid to the treating chamber 134 according to a cycle of operation. The steam generating system 180 may include a steam generator 182 fluidly coupled with the water supply 168 through a steam inlet conduit 184. A fluid control valve 185 may be used to control the flow of water from the water supply conduit 172 between the steam generating system 180 and the dispensing system 157. The steam generator 182 may further be fluidly coupled with the one or more supply conduits 163 through a steam supply conduit 186 to deliver steam to the treating chamber 134 through the nozzles 169. Alternatively, the steam generator 182 may be coupled with the treating chamber 134 through one or more conduits and nozzles independently of the dispensing system 157.

The steam generator 182 may be any type of device that converts the supplied liquid to steam. For example, the steam generator 182 may be a tank-type steam generator that stores a volume of liquid and heats the volume of liquid to convert the liquid to steam. Alternatively, the steam generator 182 may be an in-line steam generator that converts the liquid to steam as the liquid flows through the steam generator 182.

It will be understood that the details of the dispensing system 157 and steam generating system 180 are not germane to the embodiments of the invention and that any suitable dispensing system and/or steam generating system may be used with the dryer 100. It may also within the scope of the invention for the dryer 100 to not include a dispensing system or a steam generating system.

Figure 4:
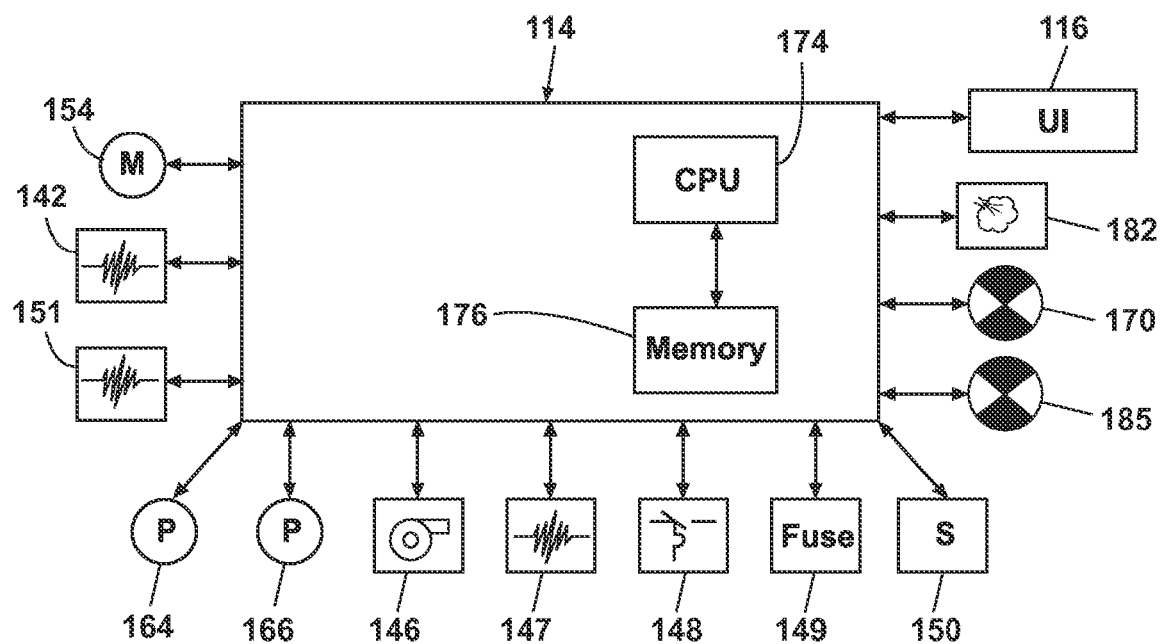
FIG. 4 is a schematic view of a controller of the clothes dryer of FIG. 3.

FIG. 4 is a schematic view of the controller 114 coupled with the various components of the dryer 100. The controller 114 may be communicably coupled with components of the clothes dryer 100 such as the heating element 142, blower 146, thermistor 147, thermostat 148, thermal fuse 149, thermistor 151, moisture sensor 150, motor 154, inlet valve 170, pumps 164, 166, steam generator 182 and fluid control valve 185 to either control these components and/or receive their input for use in controlling the components. The controller 114 may also be operably coupled with the user interface 116 to receive input from the user through the user interface 116 for the implementation of the drying cycle and provide the user with information regarding the drying cycle.

The user interface 116 may be provided having operational controls such as dials, lights, knobs, levers, buttons, switches, and displays enabling the user to input commands to a controller 114 and receive information about a treatment cycle from components in the clothes dryer 100 or via input by the user through the user interface 116. The user may enter many different types of information, including, without limitation, cycle selection and cycle parameters, such as cycle options. Any suitable cycle may be used. Non-limiting examples include, Casual, Delicate, Super Delicate, Heavy Duty, Normal Dry, Damp Dry, Sanitize, Quick Dry, Timed Dry, and Jeans.

The controller 114 may implement a treatment cycle selected by the user according to any options selected by the user and provide related information to the user. The controller 114 may also include a central processing unit (CPU) 174 and an associated memory 176 where various treatment cycles and associated data, such as look-up tables, may be stored. One or more software applications, such as an arrangement of executable commands/instructions may be stored in the memory and executed by the CPU 174 to implement the one or more treatment cycles.

In general, the controller 114 will effect a cycle of operation to effect a treating of the laundry in the treating chamber 134, which may or may not include drying. The controller 114 may actuate the blower 146 to draw an inlet air flow 158 into the supply conduit 138 through the rear vent 137 when air flow may be needed for a selected treating cycle. The controller 114 may activate the heating element 142 to heat the inlet air flow 158 as it passes over the heating element 142, with the heated air 159 being supplied to the treating chamber 134. The heated air 159 may be in contact with a laundry load 136 as it passes through the treating chamber 134 on its way to the exhaust conduit 144 to effect a moisture removal of the laundry. The heated air 159 may exit the treating chamber 134, and flow through the blower 146 and the exhaust conduit 144 to the outside of the clothes dryer 100. The controller 114 continues the cycle of operation until completed. If the cycle of operation includes drying, the controller 114 determines when the laundry may be dry. The determination of a "dry" load may be made in different ways, but may be often based on the moisture content of the laundry, which may be typically set by the user based on the selected cycle, an option to the selected cycle, or a user-defined preference.

The clothes dryer 100 may also be operated according to the method 10. More specifically, the cycle of operation may be executed by the controller 114. This may include that the closed loop control algorithm having programmable control variables for at least some of the actuators may be implemented by the CPU 174. By way of non-limiting examples, the actuators having the programmable control variables have been illustrated as the blower 146, the heating element 142, and the motor 154. The controller 114 may receive sensor feedback related to at least one of the control variables for one of the blower 146, the heating element 142, and the motor 154 during the implementation of the cycle of operation. This may include receiving data provided from the thermistor 147, thermostat 148, moisture sensor 150, thermistor 151, thermal fuse 149, or an airflow sensor. The controller 114 may then calculate gradients from the sensor feedback for the at least one of the control variables and control the blower 416, the heating element 142, the motor 154, etc. by adjusting the control variable based on the calculated gradients with an auto-tuning algorithm.

Figure 5:
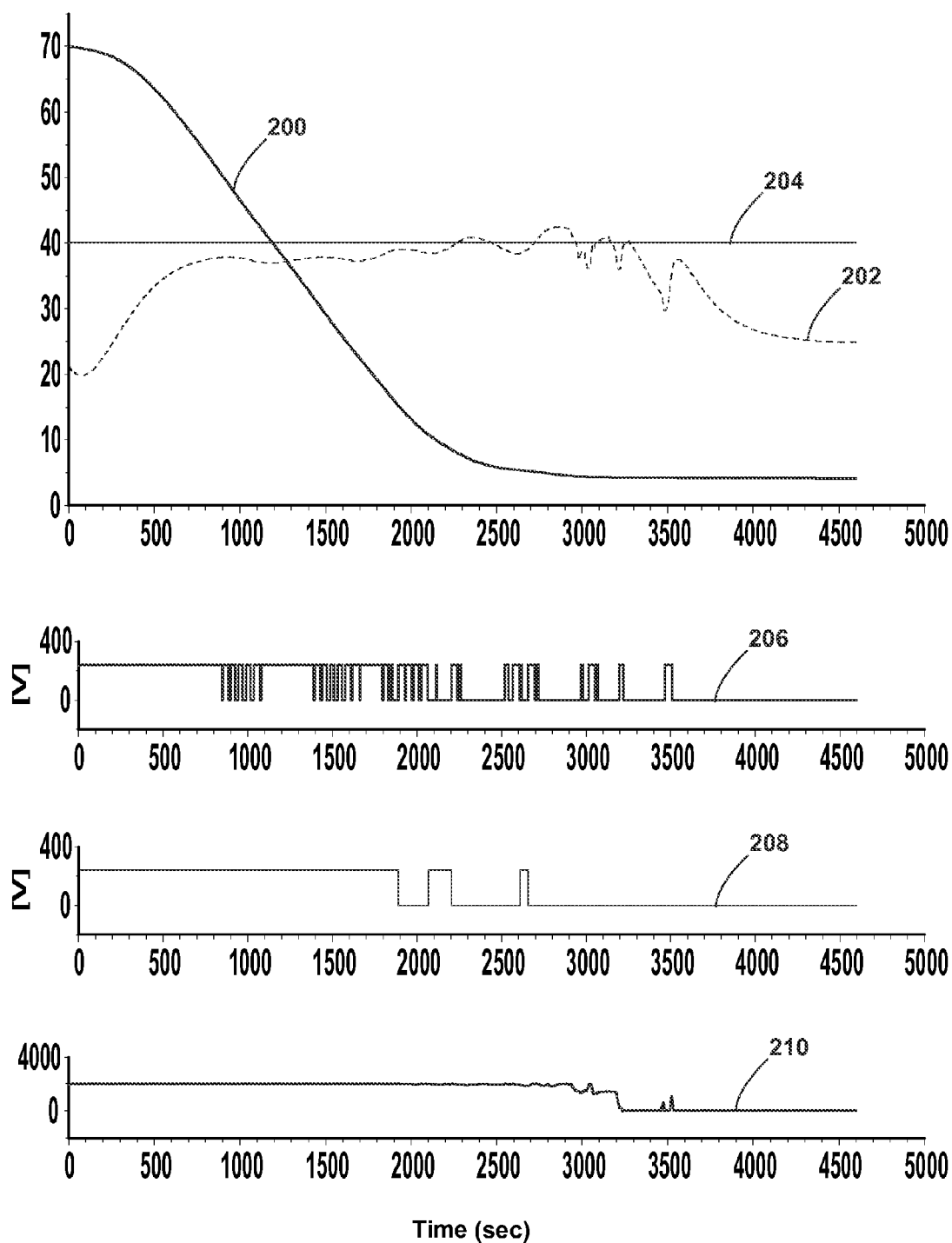
FIG. 5 illustrates a dry cycle utilizing an embodiment of the invention.

It will be understood that the control variable may include a gain and that adjustments may be made to the gain until the heating element 142 corresponding to the temperature shuts down. This may reduce energy consumption and cycle time. Further, the method simplifies controls and may effectively function as a switch, such as an on/off of the actuator, without the need for an actual switch. FIG. 5 illustrates an example where the method 10 may be utilized to shut down the heater by reducing the control gain as soon as the clothes are nearly dry, i.e. have a residual moisture content (RMC) of less than five percent. The upper most portion illustrates a RMC 200, exhaust temperature detected 202, and temperature set point 204, which show that when the laundry may be nearly dry in the clothes dryer 100 any actuation of the heating element 142 may cause a large rise in exhaust air temperature 202 as most of the clothes moisture has already evaporated. The method 10 may be used to sharply reduce the control gains and hence turn off the heating element 142 in such a scenario. The middle portion illustrates at 206 when a first portion of the heating element 142 is on and at 208 when a second portion of the heating element 142 is on. The bottom portion illustrates that there may be a drop in the control gain 210 as soon as the clothes are nearly dry, which shuts off the heating element 142 to automatically terminate the dry cycle and save energy. This automatic end cycle detection may require only one temperature sensor at the drum exhaust, such as the thermistor 151, as opposed to the RMC estimation based end cycle detection that is currently used, which requires a temperature sensor for the inlet and a temperature sensor for the exit air temperature. This may reduce the cost of the clothes dryer 100 as only a single temperature sensor would be needed. This results in energy savings of around ten percent when compared with operation of dryer without using the method for a dry cycle of one hour.

Figure 6A:
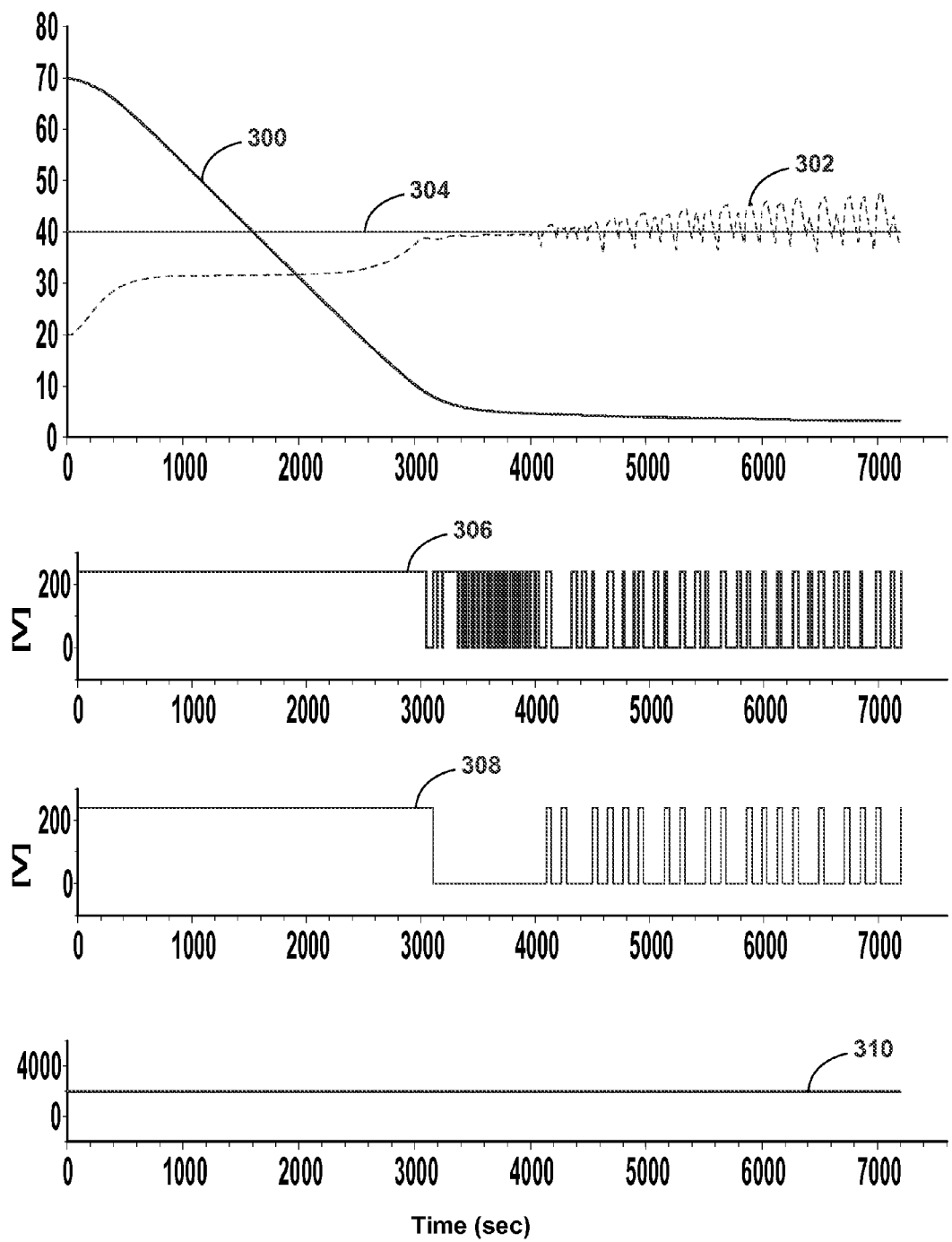
FIGS. 6A-6B illustrate a difference between dry cycles utilizing an embodiment of the invention.
Figure 6B:
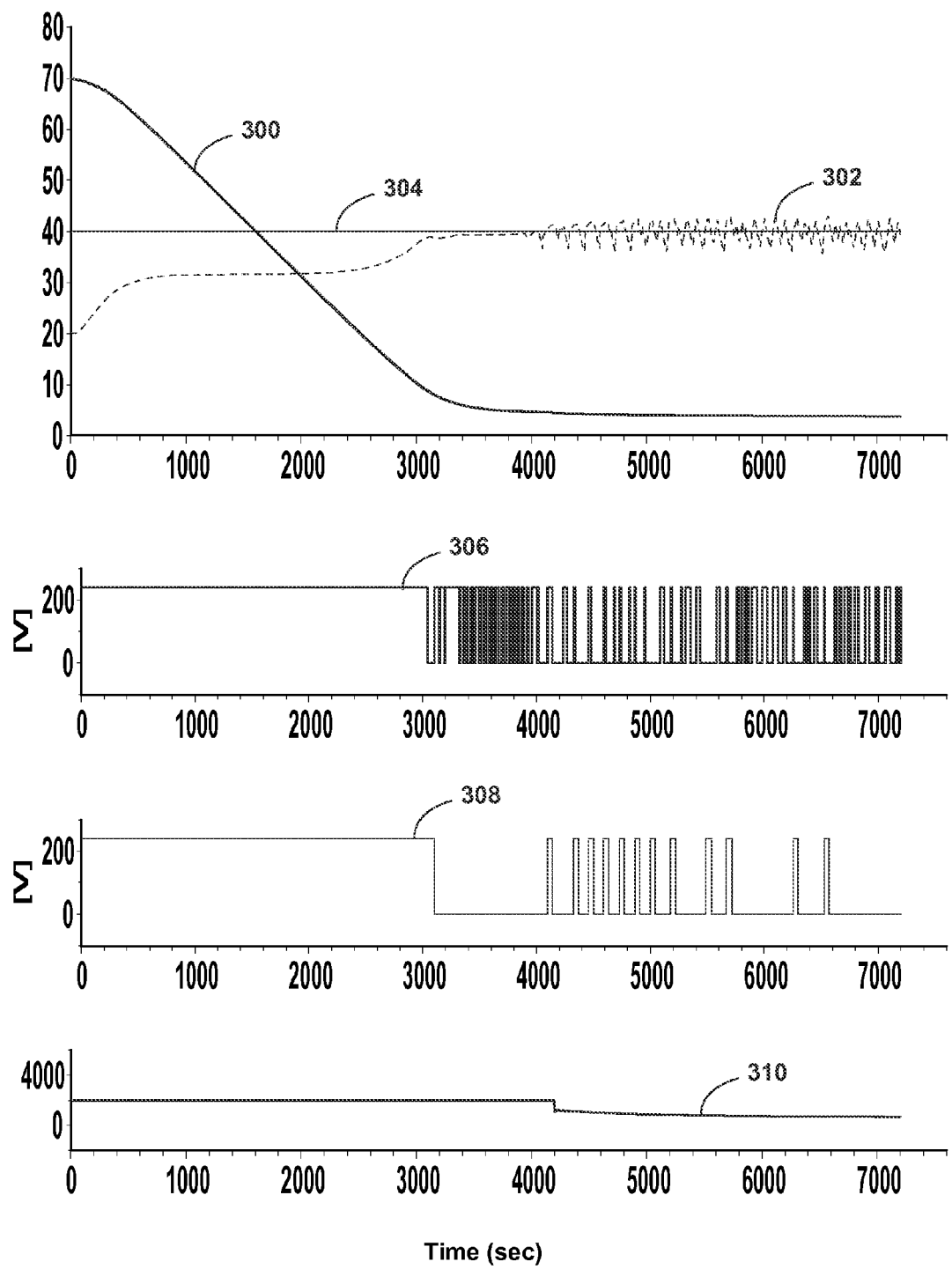

Alternatively, adjustments may be made to the gain until the heating element 142 tracks the set point temperature. This may lower the maximum temperatures reached within the drum 128. FIGS. 6A and 6B illustrate the difference between dry cycles with and without utilizing embodiments of the inventive method for an eight kg clothes load over a two hour cycle. More specifically, 6A is an example of the operation of the clothes dryer 100 without utilizing the method 10. The upper most portion illustrates a RMC 300, exhaust temperature detected 302, and temperature set point 304. The middle portion illustrates at 306 when a first portion of the heating element 142 is on and at 308 when a second portion of the heating element 142 is on and the lower portion illustrates that the control variable at 310. As may be seen there is no change in the control variable 310 and the temperature begins to creep upwards during the cycle. In comparison, FIG. 6B, which illustrates the utilization of the method 10, more precisely tracks the set point temperature 304 and reduces the maximum temperature reached during the dry cycle. Utilization of the method 10 clearly illustrates that the exhaust temperature detected 302 tracks the temperature set point 304 much better and the maximum clothes temperature stays lower. This may result in improved fabric care by lowering the maximum fabric temperature reached.

Figure 7A:
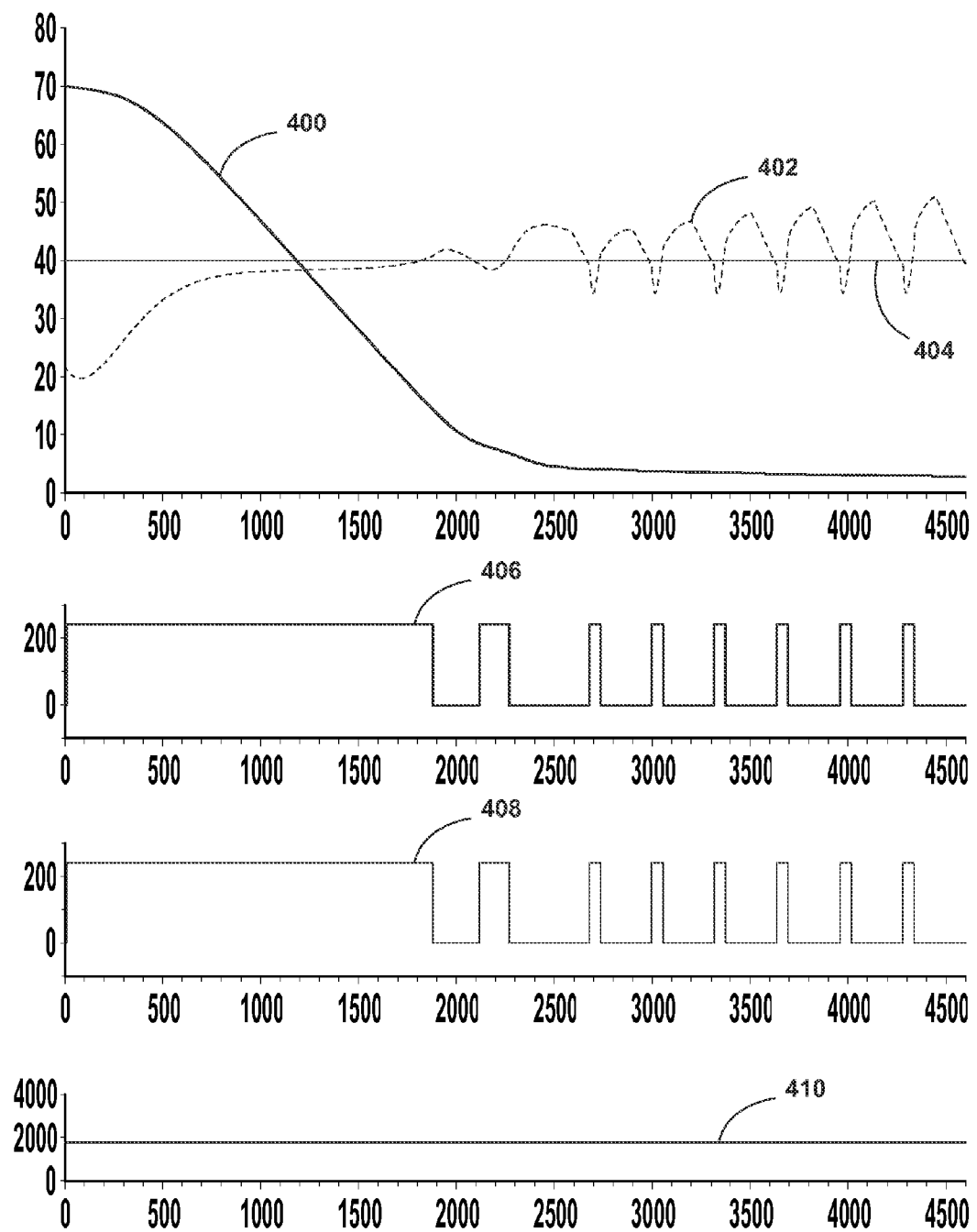
FIG. 7A-7B illustrate a difference between dry cycles utilizing an embodiment of the invention.
Figure 7B:
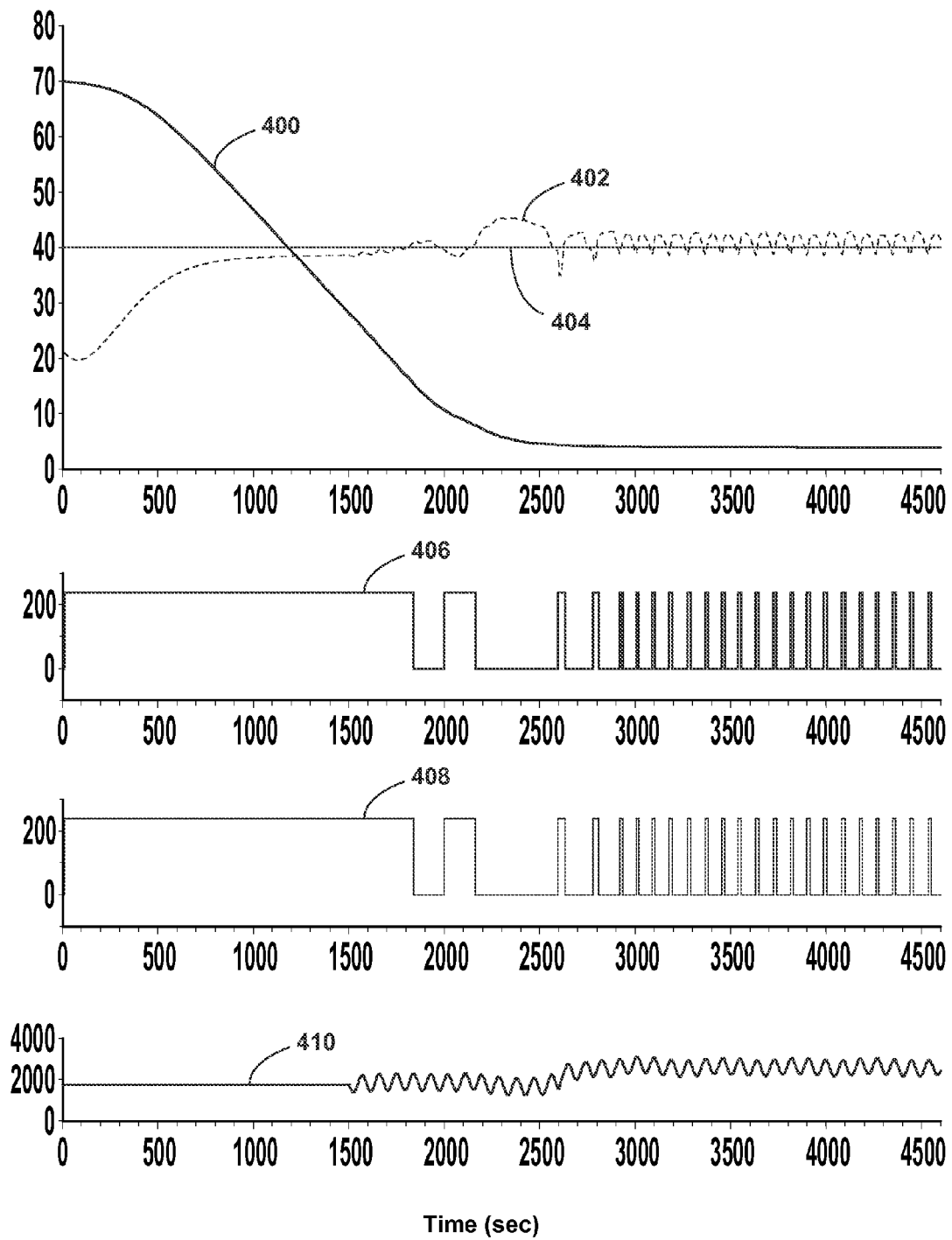

As yet another example, adjustments may be made to the gain until a speed of a blower 146 changes. This may improve drying performance by reducing maximum temperatures in the drum 128. The vent restriction in a home may vary significantly, causing a large drop in airflow. FIGS. 7A and 7B illustrate the difference between dry cycles with and without utilizing embodiments of the inventive method for a four kg clothes load. More specifically, 7A is an example of the operation of the clothes dryer 100 without utilizing the method 10. The upper most portion illustrates a RMC 400, exhaust temperature detected 402, and temperature set point 404. The middle portion illustrates at 406 and 408 where portions of the heating element 142 are on and the lower portion illustrates the control variable at 410. As may be seen there is no change in the control variable 410 and the exhaust temperature detected 402 begins to creep upwards during the cycle. In comparison, FIG. 7B, which illustrates the utilization of the method 10, adapts the control variable 410 that controls the speed of the blower 46 in response to a sharp drop in airflow caused by a vent restriction to minimize the difference between the exhaust temperature detected 402 and temperature set point 404. With the utilization of the method 10 there may be a more precise tracking of the temperature set point 404, which lowers the maximum temperature reached during the cycle for improved fabric care.

The above embodiments provide a variety of benefits including that home appliances may be operated in a manner that improves performance, reduces energy usage, and reduces cycle times of the home appliance. In current home appliances, control variables and set points for feedback control loops are tuned and calibrated based on laboratory conditions. Loads, signal noises, and ambient conditions may vary widely in each home where such home appliances may be utilized. The above described embodiments allow calibration of home appliances to leverage the knowledge of usage patterns, load characteristics, and environment conditions unique to a user's home, which may in turn result in energy savings and performance improvement. The above described embodiments also provide for simplified control of the laundry treating appliance and reduced components including switches.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a home appliance having a treating chamber for receiving an article for treatment according to an automatic cycle of operation stored in memory of a programmable controller operably controlling one or more actuators to implement the cycle of operation, the method comprising:
   implementing the cycle of operation by executing on the controller a closed loop control algorithm having programmable control variables for at least some of the actuators;
   receiving sensor feedback related to at least one of the control variables for one of the actuators during the implementing of the cycle of operation;
   calculating at least one gradient from the sensor feedback for the at least one of the control variables; and
   controlling the one of the actuators by adjusting the control variable based on the calculated at least one gradient with an auto-tuning algorithm;
   wherein the control variables include at least a gain.

2. The method of claim 1 wherein the auto-tuning algorithm comprises an extremum seeking control algorithm.

3. The method of claim 2 wherein the home appliance comprises a clothes dryer.

4. The method of claim 3 wherein the sensor feedback comprises data provided from a temperature sensor, a moisture sensor, or an airflow sensor of the clothes dryer.

5. The method of claim 3 wherein adjustments are made to the gain until a heater shuts down.

6. The method of claim 5 wherein the adjusting the at least one of the control variables reduces energy consumption and cycle time of a cycle of operation of the clothes dryer.

7. The method of claim 3 wherein adjustments are made to the gain until a heater generates heat such that an exhaust temperature tracks the set point temperature.

8. The method of claim 7 wherein the adjusting the at least one of the control variables lowers maximum temperatures reached within a drum of the clothes dryer.

9. The method of claim 1 wherein adjustments are made to the gain until a speed of a blower fan changes.

10. The method of claim 9 wherein the adjusting the at least one of the control variables improves drying performance by reducing maximum temperatures in a drum of a clothes dryer.

11. The method of claim 1 wherein the receiving, calculating, and controlling are automatically executed on a predetermined schedule.

12. The method of claim 1 wherein the receiving, calculating, and controlling are prompted by a user input.

13. The method of claim 1 wherein the auto-tuning algorithm comprises an iterative feedback tuning algorithm.

14. The method of claim 1 wherein the home appliance comprises a clothes washing machine.

15. The method of claim 14 wherein the sensor feedback comprises data provided from a speed sensor or acceleration sensor of the clothes washing machine.

16. A method of operating a refrigerator having a treating chamber for receiving an article for treatment according to an automatic cycle of operation stored in memory of a programmable controller operably controlling one or more actuators to implement the cycle of operation, the method comprising:

implementing the cycle of operation by executing on the controller a closed loop control algorithm having programmable control variables for at least some of the actuators;

receiving sensor feedback related to at least one of the control variables for one of the actuators during the implementing of the cycle of operation;

calculating at least one gradient from the sensor feedback for the at least one of the control variables; and controlling the one of the actuators by adjusting the control variable based on the calculated at least one gradient with an auto-tuning algorithm.

17. The method of claim 16 wherein the sensor feedback comprises data provided from a temperature sensor or airflow sensor of the refrigerator.

18. A method of operating a dishwasher having a treating chamber for receiving an article for treatment according to an automatic cycle of operation stored in memory of a programmable controller operably controlling one or more actuators to implement the cycle of operation, the method comprising:

implementing the cycle of operation by executing on the controller a closed loop control algorithm having programmable control variables for at least some of the actuators;

receiving sensor feedback related to at least one of the control variables for one of the actuators during the implementing of the cycle of operation;

calculating at least one gradient from the sensor feedback for the at least one of the control variables; and controlling the one of the actuators by adjusting the control variable based on the calculated at least one gradient with an auto-tuning algorithm.

19. The method of claim 18 wherein the sensor feedback comprises data provided from a soil sensor or a temperature sensor of the dishwasher.

* * * * *